(12) United States Patent
Sunkavally et al.

(10) Patent No.: US 11,343,255 B2
(45) Date of Patent: May 24, 2022

(54) SECURITY POLICY EXCHANGE AND ENFORCEMENT FOR QUESTION DELEGATION ENVIRONMENTS

(71) Applicant: EMC IP Holding Company LLC, Hopkinton, MA (US)

(72) Inventors: Naveen Sunkavally, Cary, NC (US); Brian C. Mullins, Burlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 401 days.

(21) Appl. No.: 16/456,302

(22) Filed: Jun. 28, 2019

(65) Prior Publication Data

US 2020/0412730 A1 Dec. 31, 2020

(51) Int. Cl.
*G06Q 50/18* (2012.01)
*H04L 9/40* (2022.01)

(52) U.S. Cl.
CPC ........ *H04L 63/102* (2013.01); *H04L 63/0263* (2013.01); *H04L 63/0823* (2013.01); *H04L 63/105* (2013.01); *H04L 63/168* (2013.01); *H04L 63/20* (2013.01)

(58) Field of Classification Search
CPC ............... H04L 63/102; H04L 63/0263; H04L 63/0823; H04L 63/20; H04L 63/105; H04L 63/168; H04L 67/20
See application file for complete search history.

(56) References Cited

U.S. PATENT DOCUMENTS

| 7,127,524 B1 | 10/2006 | Renda et al. |
| 2003/0088520 A1 | 5/2003 | Bohrer et al. |

(Continued)

OTHER PUBLICATIONS

Office of the Comptroller of the Currency, Risk Management for Third Party Relationships—OCC Expectations for Wealth Management Activities FIRMA Annual Risk Management Conference, Apr. 22, 2015, https://www.thefirma.org/files/conference/2015/Dalton-Risk%20Mgt%20Third%20Parties.pdf.

(Continued)

*Primary Examiner* — Michael R Vaughan
(74) *Attorney, Agent, or Firm* — Ryan, Mason & Lewis, LLP

(57) ABSTRACT

Techniques are provided for question delegation and security enforcement. One exemplary method comprises providing a third party with a question obtained from a user and a corresponding user security policy; providing a security policy response from the third party to the user indicating an acceptance of the corresponding user security policy or any proposed modifications to the corresponding user security policy for the question; performing the following steps once there is an agreement between the user and the third party regarding an accepted security policy for the question: monitoring responses to the question; enforcing directives within the accepted security policy for the question, wherein the directives comprise one or more triggers mapped to a security control and/or a compliance control for the question, and wherein each trigger has a corresponding predefined enforcement action; and performing the corresponding predefined enforcement action when a given trigger is detected.

20 Claims, 14 Drawing Sheets

(56) References Cited

U.S. PATENT DOCUMENTS

| | | | |
|---|---|---|---|
| 2004/0030566 A1* | 2/2004 | Brooks Rix | G06Q 10/1053 |
| | | | 705/321 |
| 2008/0271110 A1* | 10/2008 | Graves | G06Q 10/10 |
| | | | 726/1 |
| 2009/0276257 A1 | 11/2009 | Draper et al. | |
| 2011/0137987 A1* | 6/2011 | Tyree | G06Q 10/10 |
| | | | 709/204 |
| 2011/0302398 A1 | 12/2011 | Ureche et al. | |
| 2014/0331317 A1 | 11/2014 | Singh | |
| 2018/0285882 A1 | 10/2018 | Jayaram et al. | |
| 2021/0036850 A1* | 2/2021 | Sunkavally | H04L 9/0825 |
| 2021/0241192 A1* | 8/2021 | Mullins | G06Q 10/0635 |

OTHER PUBLICATIONS

Miike Odgen, Third-Party Assessment Exchanges and Undue Risk, Lockpath, Sep. 25, 2018, https://www.lockpath.com/blog/vendor-risk-management/third-party-assessment-exchanges-undue-risk/.

* cited by examiner

SECURITY POLICY EXCHANGE AND ENFORCEMENT FOR QUESTION DELEGATION ENVIRONMENTS

FIELD

The field relates generally to information processing.

BACKGROUND

Questionnaires are often used by companies to assess the risk posed by third-party vendors and partners. In some cases, responses from third parties may contain highly sensitive information, particularly as the responses pertain to questions about sensitive topics, such as information security practices and/or financial information. In such cases, companies and third parties often enter into non-disclosure agreements (NDAs) to ensure that the third-party data is handled in prescribed ways by the company receiving the data. There is not a clear way, however, to translate the requirements of an NDA into requirements that are technically enforceable, verifiable, and auditable. NDAs may also be vague and leave certain requirements open to interpretation.

A need therefore exists for a policy framework and workflow for companies and third parties to describe their security requirements for questionnaires in such a way that an intermediate platform can interpret and enforce those requirements.

SUMMARY

In one embodiment, a method comprises providing, by a third-party portal processing system, at least one third party with at least one question obtained from a user and a corresponding user security policy, wherein the at least one question is to be processed by the at least one third party in accordance with the corresponding user security policy; providing a security policy response from the at least one third party to the user indicating one or more of an acceptance of the corresponding user security policy and one or more proposed modifications to the corresponding user security policy for the at least one question; performing the following steps once there is an agreement between the user and the at least one third party regarding an accepted security policy for the at least one question: monitoring one or more responses to the at least one question; enforcing, by the third-party portal processing system, one or more directives within the accepted security policy for the at least one question, wherein the one or more directives comprise one or more triggers mapped to one or more of a security control and a compliance control for the at least one question, and wherein the one or more triggers each have at least one corresponding predefined enforcement action; and performing the at least one corresponding predefined enforcement action when a given trigger is detected.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for security policy exchange and enforcement for question delegation systems.

In one or more embodiments, a policy framework and workflow are provided for companies and third parties to describe their security requirements for questionnaires in such a way that an intermediate platform shared by the companies and third parties can interpret and enforce those requirements. The disclosed intermediate platform allows companies to publish questionnaires to be responded to by the third parties and allows third parties to answer questionnaires and submit responses back to companies. Among other benefits, the disclosed policy framework makes security requirements between companies and third parties explicit, and these requirements can be technically enforced, simultaneously protecting third parties and companies from the mishandling of third-party data.

In some embodiments, when a company publishes a questionnaire to a third party, the company also sends a machine-readable security policy document describing expectations for how questionnaire responses are handled. The disclosed policy framework provides a mechanism for the company and third party to reach an agreement on the security policy, and for enforcing the accepted security policy. For example, the third party can review a security policy proposed by the company and either accept, reject, or propose a new security policy. In the event that the third party proposes a new security policy, the company then reviews this new policy and can likewise choose to accept the new security policy, reject the new security policy, or propose an update. This exchange can go back and forth until an agreement on the applicable security policy is reached.

Figure 1:
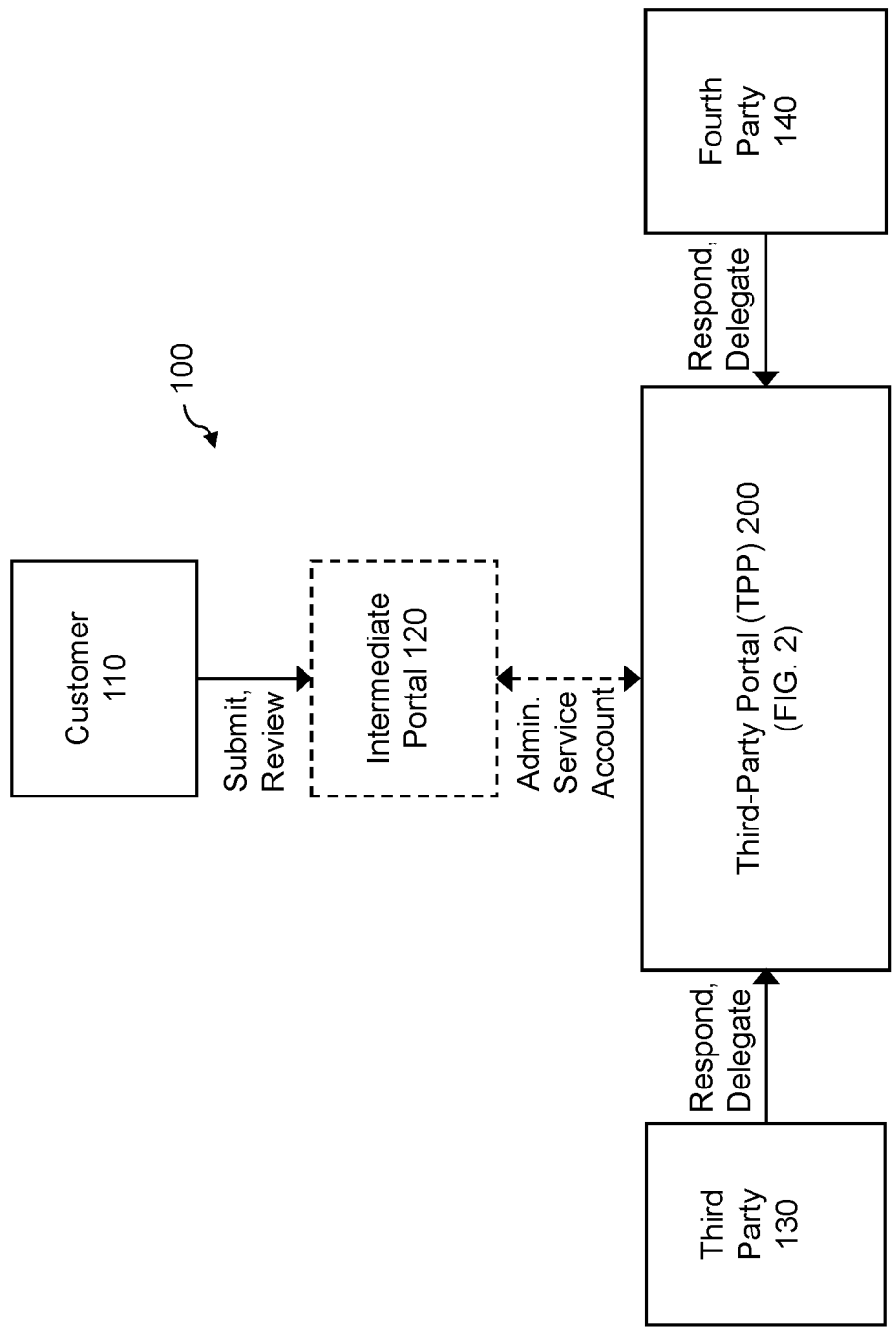
FIG. 1 illustrates a questionnaire submission and response platform, according to at least one embodiment of the disclosure.

FIG. 1 illustrates a questionnaire submission and response platform 100, according to at least one embodiment of the disclosure. As shown in FIG. 1, a customer 110 submits one or more questionnaires, optionally by means of an intermediate portal 120, discussed further below, to a third-party portal 200, as discussed further below in conjunction with FIG. 2. Questions in the questionnaire are to be responded to (and/or otherwise processed) by a designated third party 130. The third party 130 responds to the questionnaire and may optionally delegate one or more responses to another party, referred to as a fourth party 140. The fourth party 140 is delegated responsibility for responding to one or more questions by the third party 130. The fourth party 140 can optionally delegate to fifth parties (not shown) and so on. While only one instance is shown in FIG. 1 for each of the customer 110, the third party 130 and the fourth party 140, multiple or zero instances of the customer 110, the third party 130 and/or the fourth party 140 can be present in various embodiments, as would be apparent to a person of ordinary skill in the art.

In the exemplary embodiment of FIG. 1, the customer 110, third party 130 and the fourth party 140 share the same third-party portal 200.

As noted above, customers 110 optionally submit the questionnaires to the third-party portal 200 by means of the intermediate portal 120, such as the RSA Archer® platform, commercially available from RSA Security LLC, of Dell EMC, Hopkinton, Mass. The intermediate portal 120 and the third-party portal 200 communicate, for example, over a secure link using an optional administrative service account. It is noted that the third party 130 and fourth party 140 continue to use the third-party portal 200 to respond to questionnaires and/or to delegate questionnaires.

In one or more embodiments, a question submitted by the customer 110 typically comprises the following exemplary attributes:
UUID: a unique identifier for the question;
Text: the actual question; and
Tags: a set of key-value pairs describing the question, such as category.

A questionnaire comprises a list of one or more questions.

As noted above, the customer 110 is an entity (e.g., an organization or individual) that submits a questionnaire to be filled out by a designated third party 130. The customer 110 may be characterized in some embodiments, as follows:
Id (Identifier); and
Tags: an arbitrary set of key-value pairs describing the customer 110, such as a customer name and/or primary office location.

As noted above, the third party 130 is an entity that responds to a questionnaire and may optionally delegate certain responses to a fourth party 140. The third party 130 may be characterized in one or more embodiments, as follows:
Id; and
Tags: an arbitrary set of key-value pairs describing the third party 130.

As noted above, the fourth party 140 is an entity that is delegated responsibility for responding to one or more questions by a third party 130. The fourth party 140 can optionally delegate one or more questions to one or more fifth parties and so on. The fourth party 140 may be characterized in some embodiments, as follows:
Id; and
Tags: an arbitrary set of key-value pairs describing the fourth party 140.

A user of the questionnaire submission and response platform 100 is an entity and/or person representing an organization using the third-party portal 200. It is noted that a user can take the role(s) of, for example, a customer 110, a third party 130 and/or a fourth party 140.

Figure 2:
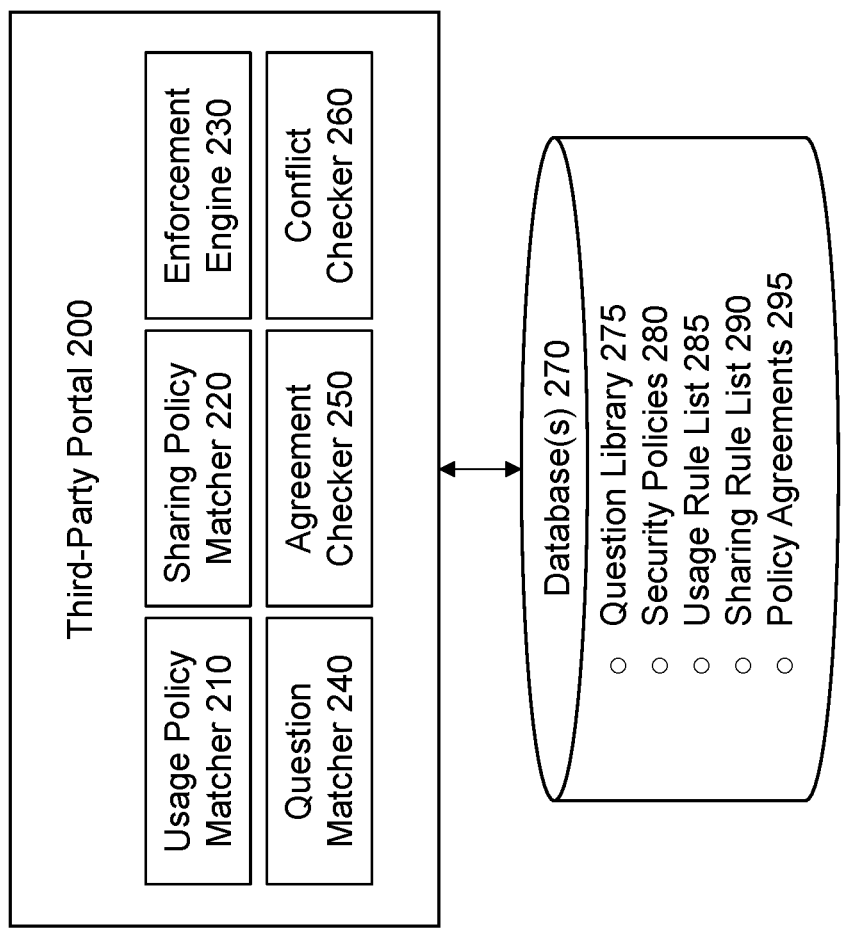
FIG. 2 illustrates an exemplary implementation of the third-party portal of FIG. 1 in further detail, according to some embodiments.

FIG. 2 illustrates an exemplary implementation of the third-party portal 200 of FIG. 1 in further detail, according to some embodiments. As shown in FIG. 2, the exemplary third-party portal 200 comprises a usage policy matcher 210; a sharing policy matcher 220; an enforcement engine 230; a question matcher 240; an agreement checker 250; and a conflict checker 260. The exemplary third-party portal 200 maintains one or more database(s) 270 comprising, for example, a question library 275, security policies 280, a usage rule list 285, a sharing rule list 290, and policy agreements 295.

In some embodiments, the question library 275 comprises a list of substantially all possible questions across all questionnaires submitted to the third-party portal 200, and maintained by the third-party portal 200.

The security policies 280 comprise, for example, a map that describes directives to be enforced for questions. The security policy map can be expressed, for example, in a key-value format, such as question=>list of directives, where the key is the question and the value is the list of directives to be enforced for that question.

Requirements covered by the security policies 280 can include (but are not limited to):
Data access expiration: how long a company has access to a response of a third party;
Data access maximum viewers: maximum number of unique individuals at a company that can view a response of a third party;
Data retention: how long the platform retains the questionnaire response;
Data location: geographic location where the questionnaire response is stored geographically; and
Data encryption: whether the third-party response needs to be protected using client-side encryption (e.g., private keys only held by customers or third parties and not the third-party portal 200) or if it is sufficient to encrypt data using platform-managed keys.

A security policy 280 can be altered after the security policy 280 has been accepted by both the customer 110 and a third party 130. In this case, the customer 110 or third party 130 can use the third-party portal 200 to propose an update to the security policy 280, and then follow a similar workflow as described herein to accept, reject, or update the policy. In some cases, it may not be possible for the third-party portal 200 to retroactively apply a new policy after the assessment has already been started. In those cases, the third-party portal 200 would raise an alert and ask if the current in-progress questionnaire should be abandoned and restarted with a new policy.

Directives comprise instructions describing a security or compliance control to be enforced by the third-party portal 200. Exemplary directives include:

- dataAccessExpiration=12 and dataAccessExpirationUnits=months: access to question response granted for 12 months to recipient of question response;
- dataAccessMaxViewers=5: at most five people at the recipient organization are allowed to view a question's response; and
- dataLocation=EU: question response data must be stored in a data center in the European Union.

The usage rule list 285 comprises one or more usage rules, represented, for example, as an ordered list (in a similar manner as network firewall rules). The last rule is a default rule in some embodiments that matches all questions and sources and purposes (question.id=*, source.id=*, purpose=*). The default rule could be completely open with no directives, meaning the security policy is applied.

A usage rule, in some embodiments, is a rule describing a set of directives to be applied to questions that match conditions in the rule. In some embodiments, three conditions in a usage rule are a question matcher pattern, a destination matcher pattern, and a purpose. Usage rules are used for questionnaire responses coming back to a user (e.g., the user is playing the role of a customer 110 or a third party 130 delegating to a fourth party 140). If the user is playing the role of a customer 110, the purpose should be VIEW. If the user is playing the role of third party 130 delegating to a fourth party 140, the purpose should be SHARE. An exemplary usage rule comprises:

- Question matcher pattern: A pattern that can be matched against a question and produces a Boolean result (true or false). The pattern uses a syntax like regular expressions and can apply to any part of a question: the UUID, Text, and Tags;
- Source matcher pattern: A pattern that can be matched against a third party and produces a Boolean result (true or false). The pattern uses a syntax like regular expressions and can apply to the third party ID and Tags;
- Purpose: Must be either VIEW or SHARE or both; and List of Directives.

The sharing rule list 290 comprises one or more sharing rules, represented as an ordered list (in a similar manner as network firewall rules). The last rule is a default rule in some embodiments that matches all questions, destinations, and purposes (question.id=*, destination.id=*, purpose=*). The default rule could be completely open with no directives, meaning the security policy is applied.

A sharing rule, in some embodiments, is a rule describing a set of directives to be applied to questions that match conditions in the rule. The three conditions are the question matcher pattern, the destination matcher pattern, and the purpose. Sharing rules are used for questionnaire responses that a user is sending out, i.e., the user is playing the role of a third party 130 responding to a questionnaire, or a fourth party 140 sharing data with a third party 130 who is responding back to a customer 110. If the user is directly responding to a customer 110, the purpose should be VIEW. If the user is responding to a third party 130 who is then sharing his/her data with a customer 110, the purpose should be SHARE. An exemplary sharing rule comprises:

- Question matcher pattern: A pattern that can be matched against a question and produces a Boolean result (true or false). The pattern uses a syntax like regular expressions and can apply to any part of a question: the UUID, Text, and Tags;
- Destination matcher pattern: A pattern that can be matched against an organization and produces a Boolean result (true or false). The pattern uses a syntax like regular expressions and can apply to the organization's ID and Tags, and also the degree of delegation, where the degree represents how many hops the data can be shared in case of delegation. For instance, a degree of 2 means a fourth party allows a third party to share its data with a customer that has reached out to the third party;
- Purpose: Must be either VIEW or SHARE or both; and List of Directives.

The policy agreements 295 comprise agreements between a third party 130 and a customer 110 that comprise:

- third-party id;
- customer id;
- Security Policy;
- Purpose: one of VIEW or SHARE;
- Agreement expiration date;
- third-party digital signature;
- customer digital signature;
- Linked agreement(s): one or more linked policy agreements. This applies in the case of delegation when a third party 130 has delegated responses to a fourth party 140, in which case the third party 130 and the fourth party 140 enter into an agreement which is linked to the original agreement between the third party 130 and the customer 110; and
- Amendment(s): zero or more signed modifications to the original agreement.

In some embodiments, the digital signature from the fourth party 140 in a policy agreement 295 is wrapped with a digital signature from the third party 130.

In one or more embodiments, the usage policy matcher 210 is a component of the third-party portal 200 that takes as inputs a questionnaire and a usage rule list and returns a security policy. For each question in the questionnaire, the usage policy matcher 210 goes, typically in order, through the usage rule list and evaluates the question matcher pattern against the question and the source matcher pattern against the third party 130 that the questionnaire is intended for. For each question, the list of directives for the first matching usage rule is returned. If none of the usage rules match, the default (last) usage rule in the list is applied.

The exemplary sharing policy matcher 220 processes a questionnaire and a sharing rule list 290 and returns a security policy 280. For each question in the questionnaire, the sharing policy matcher 220 goes, typically in order, through the sharing rule list 290 and evaluates the question matcher pattern against the question and the destination matcher pattern against the organization the questionnaire response is intended for. For each question, the list of directives for the first matching sharing rule is returned. If none of the sharing rules match, the default (last) sharing rule in the list is applied.

The exemplary enforcement engine 230 evaluates and enforces directives. A trigger is an event in the third-party portal 200 that triggers the enforcement engine 230 to check one or more directives. Each directive is associated with one or more triggers. Triggers can be based on events related to a questionnaire, such as "Questionnaire submitted", or timer-based, such as "New day started."

The question matcher 240 processes questions from the questionnaire and matches them against existing questions known to the third-party portal 200 in the question library 275.

In one or more embodiments, the agreement checker 250 processes the list of questions and checks for the most recent existing unexpired data usage agreement with Purpose=VIEW in the account of the customer 110 that cover all the questions in the questionnaire. As part of this, the agreement checker 250 optionally also needs to validate any linked agreements in cases where third parties are sharing data on behalf of fourth parties.

The conflict checker 260 attempts to construct an expected security policy for the third party 130.

Figure 3:
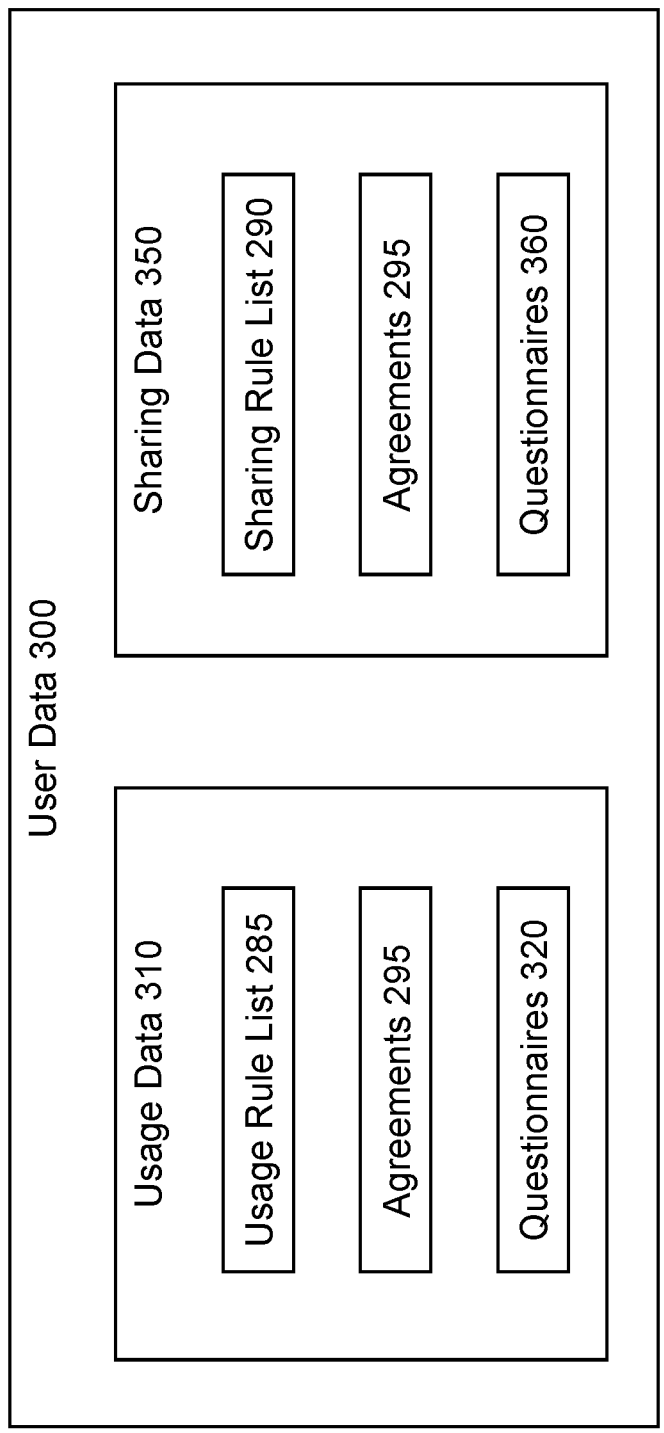
FIG. 3 illustrates exemplary user data, according to one or more embodiments.

FIG. 3 illustrates exemplary user data 300, according to some embodiments. As noted above, a user of the third-party portal 200 is a person with an account representing an organization. The organization can simultaneously be a customer 110, third party 130, fourth party 140, etc. in interactions with other organizations. In the user account, the following user data 300 maintained by the third-party portal 200 comprises data for data usage 310 and data for data sharing 350.

Playing the role of a customer 110, a user sends out questionnaires to the third parties 130 and uses the responses of third parties 130. As a customer 110, the user maintains a usage rule list 285 that describes the security policy 280 that the user would like to have for using third party data, and has a list of agreements 295 that were made with third parties 130 and questionnaires 320 that were sent to those third parties 130.

Playing the role of a third party 130 (or a fourth party 140, etc.), a user shares data with other parties or customers 110. In this role, the user maintains a sharing rule list 290 that describes a security policy 280 that the user would like to enforce for data that the user shares, and has a list of agreements 295 that were made with customers 110 and other parties, and questionnaires 360 that the user has responded to or needs to respond to.

Figure 4:
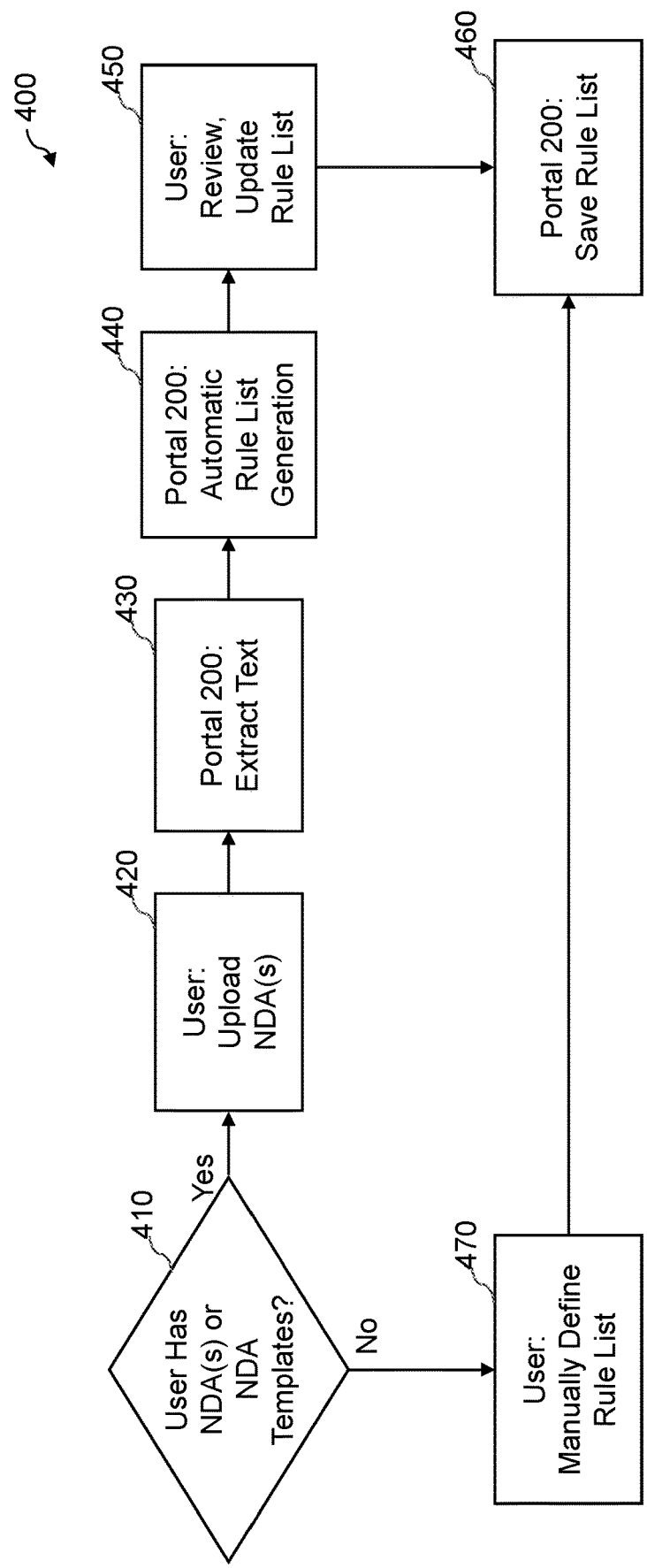
FIG. 4 is a flow chart illustrating an exemplary implementation of a rule creation process, according to one embodiment of the disclosure.

FIG. 4 is a flow chart illustrating an exemplary implementation of a rule creation process 400, according to one embodiment of the disclosure. The exemplary rule creation process 400 can be used to create usage rules for the usage rule list 285 and/or sharing rules for the sharing rule list 290.

The usage rule list 285 and the sharing rule list 290 are optionally created by importing them from one or more NDAs or NDA templates for data usage and data sharing, into the third-party portal 200 in a predefined document format (e.g., Adobe PDF or Microsoft Word), and the third-party portal 200 makes a best effort to determine the usage rule list 285 and the sharing rule list 290, respectively. The third-party portal 200 can do this by extracting text from the NDA documents and searching for keywords, or by using Natural Language Processing (NLP) techniques. Alternatively, the usage rule list 285 and the sharing rule list 290 are optionally created manually by the user.

As shown in FIG. 4, the exemplary rule creation process 400 initially performs a test during step 410 to determine if the user has NDAs and/or NDA templates. If it is determined during step 410 that there are no NDAs and/or NDA templates, the exemplary rule creation process 400 has the user manually define the rule list(s) 285, 290 during step 470. Program control then proceeds to step 460, where the third-party portal 200 saves the rule list(s) 285, 290.

If it is determined during step 410 that there are NDAs and/or NDA templates, the exemplary rule creation process 400 has the user upload the NDA(s) during step 420. The third-party portal 200 then extracts the text from the NDAs during step 430 and performs an automatic rule list generation during step 440. The user is optionally prompted to review and update the generated rule list(s) 285, 290 during step 450, and the third-party portal 200 saves the rule list(s) 285, 290 during step 460.

It is noted that the same flow of the exemplary rule creation process 400 can be used for both usage and sharing rules. The kind of rules that are generated depends on the context in which the user is uploading the NDA or NDA template during step 420. If the user is uploading an NDA as a submitter (e.g., someone sending out a questionnaire), then the flow automatically generates usage rules, because in this case the user would be receiving questionnaire responses. If the user is uploading an NDA as a vendor (e.g., someone receiving a questionnaire), then the flow automatically generates sharing rules, because in this case the user would be sending out questionnaire responses.

The rule creation process 400 of FIG. 4 can optionally be performed multiple times. For example, users can upload new NDAs as they become available and revise the usage rule list 285 and the sharing rule list 290, as desired.

Publication Flow

Figure 5:
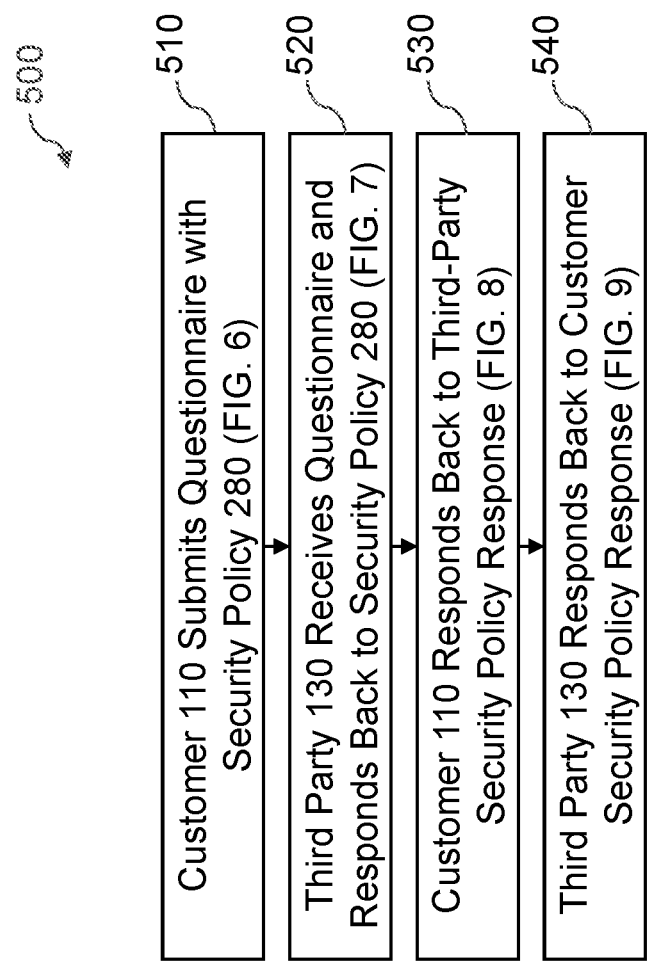
FIG. 5 is a flow chart illustrating an exemplary implementation of a publication process, according to at least one embodiment of the disclosure.

FIG. 5 is a flow chart illustrating an exemplary implementation of a publication process 500, according to at least one embodiment of the disclosure. As part of the exemplary publication process 500, a user, in the role of a customer 110, initially submits a questionnaire to a third party 130 with a corresponding security policy 280 during step 510, as discussed further below in conjunction with FIG. 6.

Thereafter, the third party 130 receives the questionnaire during step 520 and responds back to the proposed security policy 280, as discussed further below in conjunction with FIG. 7. The customer 110 then responds back to the third-party security policy response during step 530, as discussed further below in conjunction with FIG. 8. Finally, the third party 130 responds back to the customer security policy response during step 540, as discussed further below in conjunction with FIG. 9.

Figure 6:
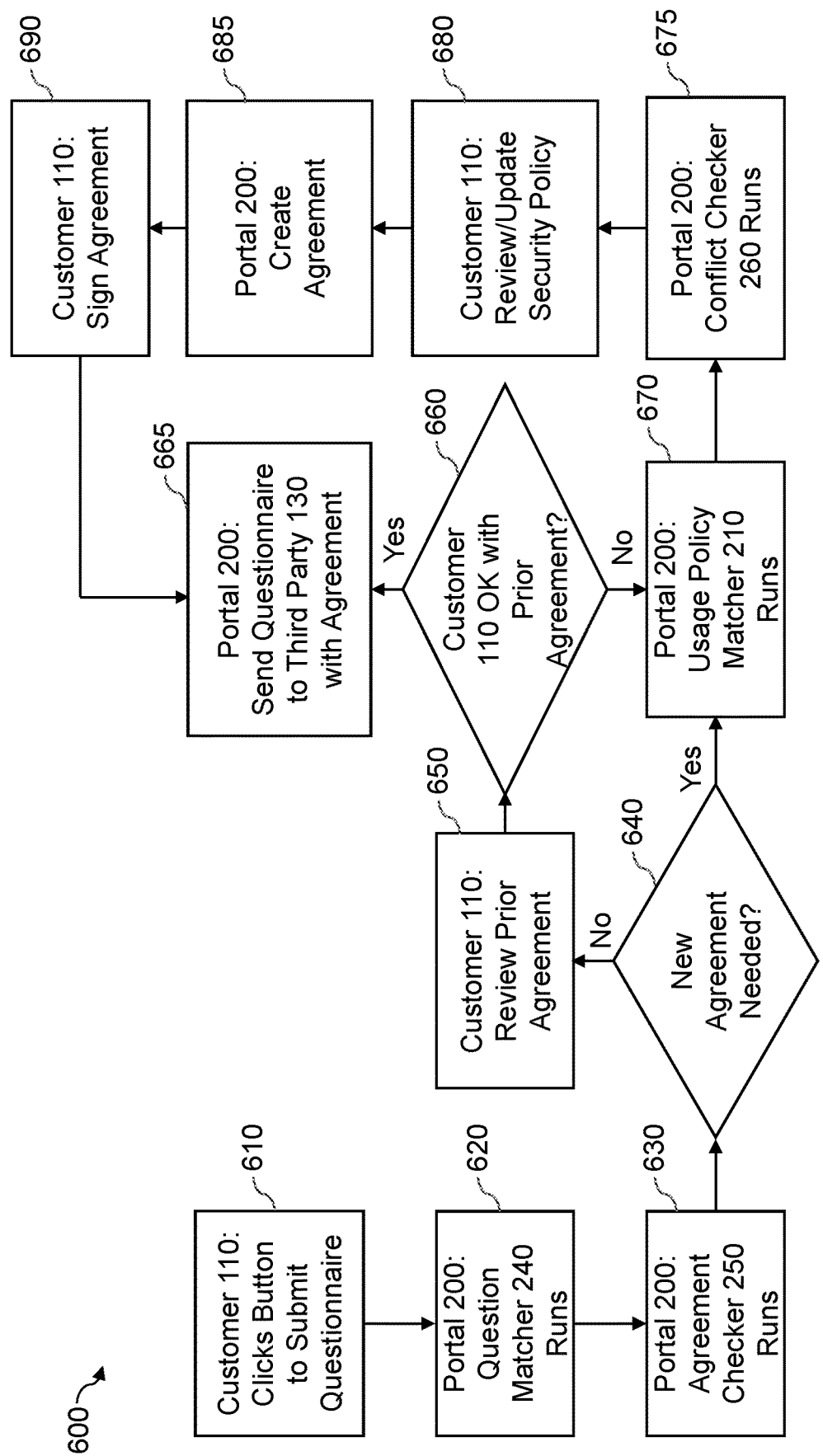
FIG. 6 is a flow chart illustrating an exemplary implementation of a questionnaire submission process, according to some embodiments of the disclosure.

FIG. 6 is a flow chart illustrating an exemplary implementation of a questionnaire submission process 600, according to some embodiments of the disclosure. As noted above, during step 510 of FIG. 5, a customer 110 initially submits a questionnaire to a third party 130 with a corresponding security policy 280. As shown in FIG. 6, the exemplary questionnaire submission process 600 initially allows a customer 110 to click a button, for example, to submit a questionnaire during step 610.

Once a customer 110 submits a questionnaire to a third party 130, the following steps are performed:

1) The customer 110 hits a "Submit" button during step 610 using an interface to the third-party portal 200 to start the flow.

2) The question matcher 240 in the third-party portal 200 takes the questions from the questionnaire during step 620 and matches them against existing questions known to the third-party portal 200 in the question library 275.
   a. This matching is done using the text of each question. There are several ways this can be done. One technique checks for an exact match against canonical versions of the question text, where the question text is normalized for punctuation and case. Another technique performs the matching by using an NLP engine.
   b. After the question matcher 240 has tried to match questions in the questionnaire against the question library 275, the question matcher 240 will come back with a list of questions with known UUIDs being tracked in the question matcher 240. However, not all questions may be matched. In that case, the question matcher 240 will add new questions (with new question UUIDs) to the question library 275.

c. The outcome of the question matcher 240 will be a list of question entities in the question library 275 that correspond to all the questions in the questionnaire.

3) The agreement checker 250 in the third-party portal 200 processes the list of questions from step 620 during step 630 and checks for the most recent existing unexpired data usage agreement with Purpose=VIEW in the account of the customer 110 that cover the questions in the questionnaire. As part of this, the agreement checker 250 also needs to validate any linked agreements in cases where third parties 130 are sharing data on behalf of fourth parties 140.

4) If it is determined during step 640 that there is an existing agreement, the agreement is presented to the customer 110 during step 650 to review the security policy 280 contained within the security agreement.

a. If the customer 110 approves of the agreement during step 660, the agreement is attached to the questionnaire and sent to the third party 130 by the third-party portal 200 during step 665. This stage is complete.

b. If the customer 110 does not approve the agreement, the flow goes to step 670.

5) If there is no existing unapproved agreement that covers the questions in the questionnaire, or the customer 110 does not like an existing agreement, the usage policy matcher 210 of the third-party portal 200 attempts to construct a security policy 280 during step 670 using the usage rule list 285 in the account of the customer 110, as discussed above. The output is a security policy 280 that maps each question to a list of directives to be applied against them.

6) During step 675, the conflict checker 260 of the third-party portal 200 runs. The conflict checker 260 first attempts to construct an expected security policy 280 of the third party 130.

a. If there is a prior unexpired agreement the third party 130 has with the customer 110 that covers all the questions (same as step 630 above), the security policy 280 in that agreement is used.

b. If there is no prior agreement, the conflict checker 260 constructs an expected security policy 280 using the sharing policy matcher 220 against all the questions and the third party's sharing rule list 290 with purpose=VIEW.

c. The conflict checker 260 then checks for questions in which the security policy 280 of the customer 110 and the expected security policy 280 of the third party 130 have conflicting directives.

d. The definition of conflict depends on each directive. For instance, if a third party 130 wants to limit access to a response to 90 days and the customer 110 wants access for 180 days, then there is a conflict. Another example is if the third party 130 requires data to be stay in a certain regional data center, whereas the customer 110 wants data to be persisted in a different data center for compliance reasons.

7) The customer 110 reviews the security policy 280 during step 680, including any conflicts discovered by the conflict checker 260. The customer 110 can revise the security policy 280 to eliminate potential conflicts upfront. The customer 110 can also add comments along with the security policy 280 explaining his/her position.

8) The third-party portal 200 drafts an agreement during step 685 with Purpose=VIEW and with the desired security policy 280 of the customer 110.

9) The customer 110 digitally signs the agreement during step 690.

10) The third-party portal 200 sends the questionnaire to the third party during step 665.

Figure 7:
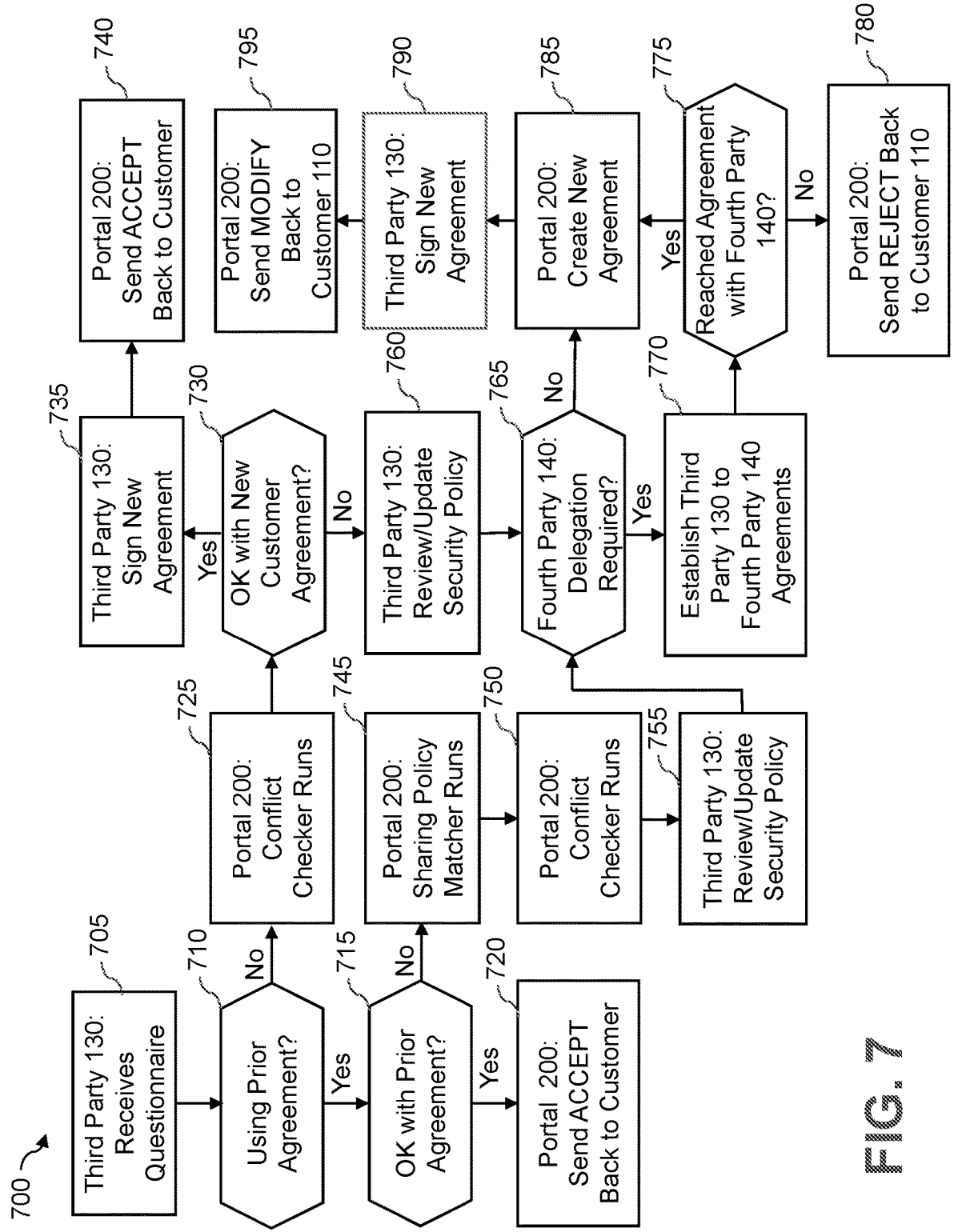
FIG. 7 is a flow chart illustrating an exemplary implementation of a third-party questionnaire evaluation process, according to one or more embodiments of the disclosure.

FIG. 7 is a flow chart illustrating an exemplary implementation of a third-party questionnaire evaluation process 700, according to one or more embodiments of the disclosure. As noted above, during step 520 of FIG. 5, the third party 130 receives the questionnaire and responds back to the proposed security policy 280.

1) As shown in FIG. 7, during step 705, the third party receives the questionnaire along with the security policy 280 from the customer 110 through the third-party portal 200.

2) If it is determined during step 710 that the questionnaire has a prior existing agreement attached, the third party 130 reviews the agreement:

a. If it is determined during step 715 that the third party 130 likes the existing agreement, he/she can accept the agreement and the third-party portal 200 will send the acceptance back to the customer 110 during step 720.

b. If it is determined during step 710 that the third party does not like the existing agreement, he/she can propose a security policy 280 to use.

i. The sharing policy matcher 220 of the third-party portal 200 constructs a security policy 280 during step 745 using the sharing rule list 290 of the third party 130 and questions in the questionnaire with purpose=VIEW.

ii. During step 750, the conflict checker 260 of the third-party portal 200 compares the constructed security policy 280 of the third party 130 against the security policy 280 in the agreement sent by the customer 110.

iii. The third party 130 reviews the security policy 280 during step 755, including any conflicts discovered by the conflict checker 260. The third party 130 can manually update the security policy 280, as desired.

iv. Go to Step 765.

3) If it is determined during step 710 that the questionnaire has a new agreement attached, the conflict checker 260 of the third-party portal 200 runs during step 725. The conflict checker 260 constructs an expected security policy 280 for the third party 130 using two methods: first it uses the agreement checker 250 to see if there is an existing unexpired data sharing agreement with the customer 110 with purpose=View that covers the questions in the questionnaire. If such an agreement exists, the security policy 280 from that agreement is used. Otherwise, the sharing policy matcher 220 is run against the sharing rule list 290 of the third party 130 with purpose=VIEW to construct a security policy 280. Finally, the conflict checker 260 checks for conflicts between the security policy 280 in the agreement and the constructed security policy 280 of the third party 130.

4) The third party 130 reviews the security policy 280 during step 730, including any conflicts discovered by the conflict checker 260. If the third party agrees with the security policy 280 during step 730, the third party 130 signs the agreement during step 735 and accepts the security policy 280. The third-party portal 200 will then send the acceptance back to the customer 110 during step 740. The new agreement is saved in the account data of the third party 130 as a data sharing agreement 295.

5) If the third party 130 is not in agreement with the proposed security policy 280 from the customer 110, the third party 130 can manually update the proposed security policy 280 during step 760 to propose a new security policy 280.

6) The third party 130 checks if there are any responses that require delegation to a fourth party 140 to respond to during step 765.
   a. If delegation is required, the third party 130 initiates new flows during step 770 to get agreements with the delegated parties that are consistent with the desired security policy 280. These flows are conceptually the same as the flow between the customer 110 and the third party 130 (starting with FIG. 6), except in this case, the third party 130 is acting like a customer 110 and the fourth party 140 is acting like the third party 130. The notable differences are:
      i. The purpose of agreements third parties establish with delegated parties should be SHARE instead of VIEW; and
      ii. The usage policy matcher 210 and sharing policy matcher 220 in these flows with delegated parties should be run with purpose=SHARE.
   b. The security policy 280 is updated again to be consistent with agreements reached with Delegated Parties.
   c. If it is determined during step 775 that an agreement with a delegated party cannot be reached, the questionnaire and its security policy 280 is REJECTED during step 780.

7) The third-party portal 200 creates a new agreement during step 785. Any new agreements that were reached with delegated parties are linked to the new agreement.

8) The third party 130 signs the new agreement during step 790.

9) The third-party portal 200 sends the revised security policy 280 back in a new agreement to the customer 110 to review during step 795.

10) At any point in the above flow, the third party 130 can REJECT the questionnaire and the security policy 280 altogether (not shown explicitly in FIG. 7).

Figure 8:
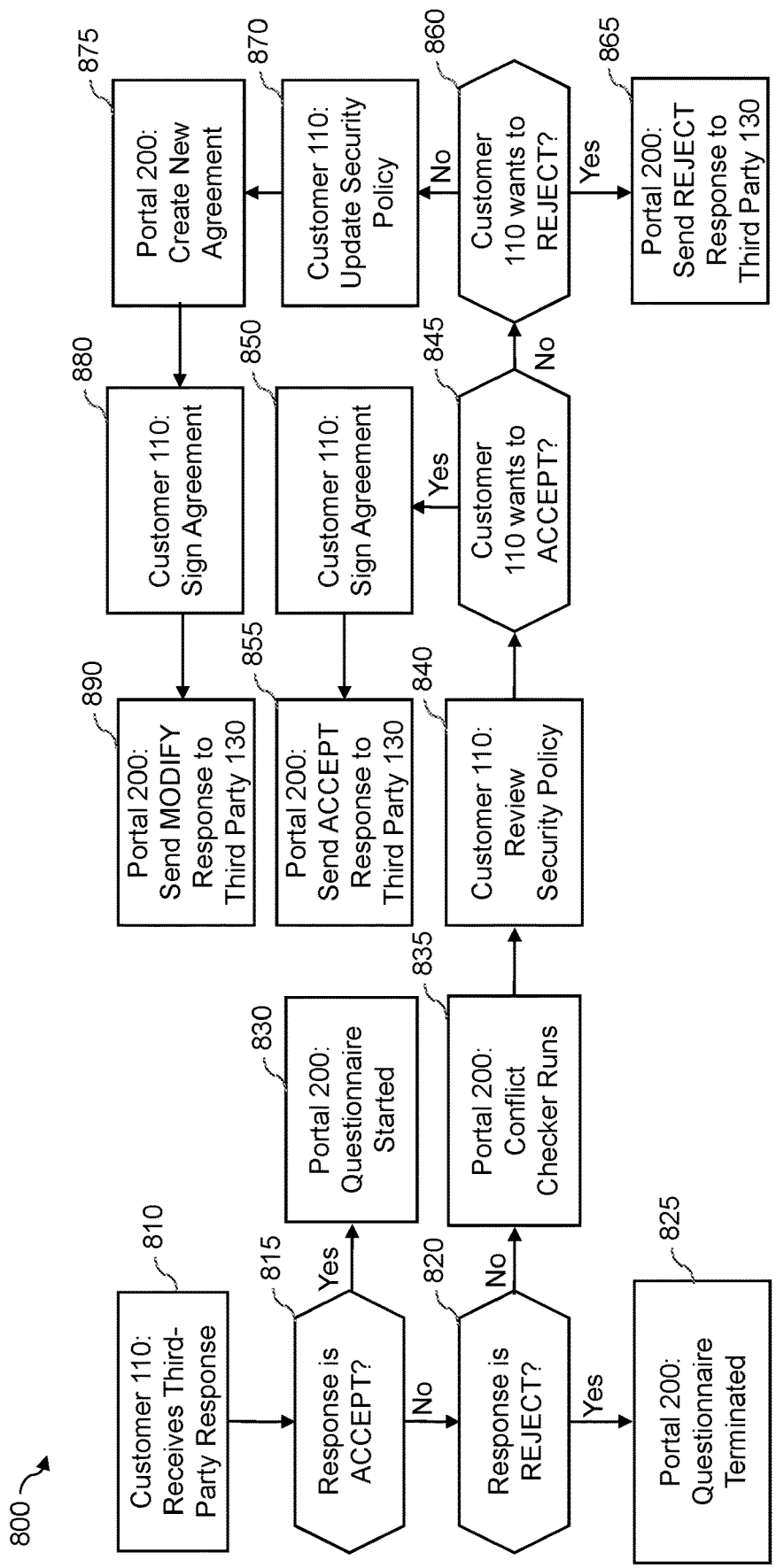
FIG. 8 is a flow chart illustrating an exemplary implementation of a customer security policy evaluation process, according to some embodiments.

FIG. 8 is a flow chart illustrating an exemplary implementation of a customer security policy evaluation process 800, according to some embodiments of the disclosure. As noted above, during step 530 of FIG. 5, the customer 110 responds back to the third-party security policy response. As shown in FIG. 8, in this stage, the customer 110 receives the security policy response from the third party 130 during step 810.

1) If it is determined during step 815 that the response of the third party 130 is ACCEPT:
   a. If using a prior agreement, the questionnaire is started during step 830;
   b. If this is a new agreement signed by both the customer 110 and third party 130, the new agreement is saved as an agreement 295 under the usage data 310 in the account of the customer 110, and then the questionnaire is started.

2) If the response of the third party 130 is REJECT during step 820, the questionnaire is terminated during step 825. The customer 110 can start a new questionnaire if he/she wants to.

3) If the response of the third party 130 is MODIFY during step 820:
   a. The conflict checker 260 of the third-party portal 200 runs during step 835 and compares the security policy 280 sent by the third party 130 with the previous security policy 280 sent by the customer 110.
   b. The customer 110 reviews the security policy 280 of the third party 130 during step 840 along with any possible conflicts raised by the conflict checker 260.
   c. The customer 110 can now do one of:
      i. ACCEPT the security policy 280 of the third party 130 during step 845. Then, the customer 110 signs the agreement with the proposed security policy 280 of the third party 130 during step 850 and the third-party portal 200 sends an ACCEPT response back to the third party 130 during step 855. If using a new agreement, the new agreement is saved as an agreement 295 under the usage data 310 in the account of the customer 110.
      ii. MODIFY (determined during step 860) the security policy 280 by manually updating the security policy 280 during step 870 and then the third-party portal 200 creates the new agreement during step 875. The customer 110 then signs a new agreement during step 880 and the third-party portal 200 sends the new agreement to the third party 130 during step 890.
      iii. REJECT (determined during step 860) the security policy 280 and send a REJECT response back to the third party 130 during step 865 through the third-party portal 200.

Figure 9:
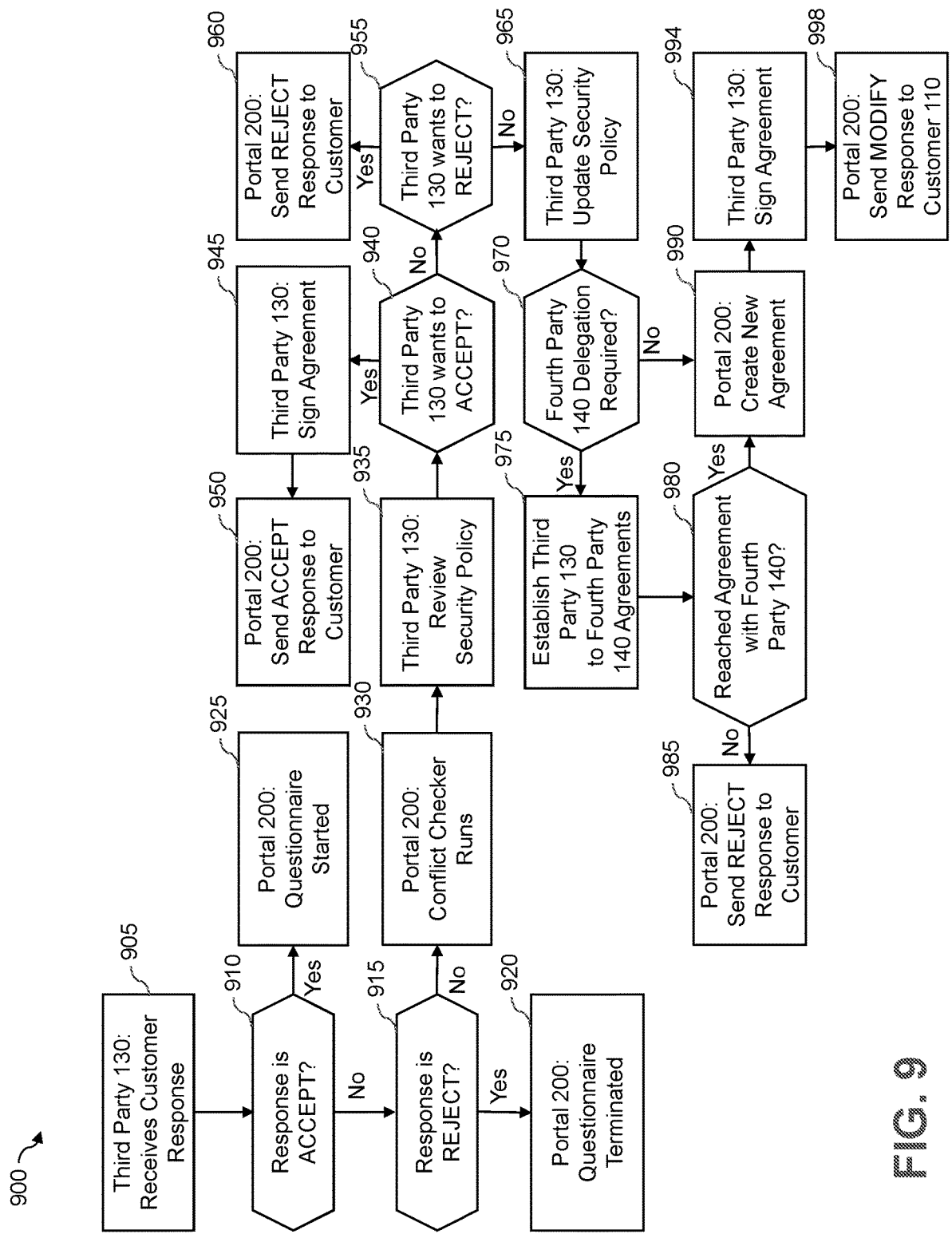
FIG. 9 is a flow chart illustrating an exemplary implementation of a third-party security policy evaluation process, according to one or more embodiments of the disclosure.

FIG. 9 is a flow chart illustrating an exemplary implementation of a third-party security policy evaluation process 900, according to one or more embodiments of the disclosure. As noted above, during step 540 of FIG. 5, the third party 130 responds back to the customer security policy response. It is noted that this stage is optional and is only required if the questionnaire was not started in FIG. 8. In addition, the flow of FIG. 9 is similar to FIG. 8 except that the flow is from the perspective of the third party 130, and the third party 130 has the option to delegate to fourth parties 140. The delegation flow is similar to what was described in FIG. 7. Generally, the flow can bounce indefinitely between FIG. 8 and FIG. 9 until both the customer 110 and the third party 130 sign the same agreement, or one of the parties REJECTS the questionnaire altogether.

As shown in FIG. 9, in this stage, the third party 130 receives the security policy response from the customer 110 during step 905.

1) If it is determined during step 910 that the response of the customer 110 is ACCEPT:
   a. If using a prior agreement, the questionnaire is started during step 925;
   b. If this is a new agreement signed by both the customer 110 and third party 130, the new agreement is saved as an agreement 295 under the sharing data 350 in the account of the third party 130, and then the questionnaire is started.

2) If the response of the customer 110 is REJECT during step 915, the questionnaire is terminated during step 920. The third party 130 can start a new questionnaire if he/she wants to.

3) If the response of the 110 is MODIFY during step 915:
   a. The conflict checker 260 of the third-party portal 200 runs during step 930 and compares the security policy 280 sent by the customer 110 with the previous security policy 280 of the third party 130.
   b. The third party 130 reviews the security policy 280 of the customer 110 during step 935 along with any possible conflicts raised by the conflict checker 260.

c. The third party 130 can now do one of:
  i. ACCEPT the security policy 280 of the customer 110 during step 940. Then, the third party 130 signs the agreement with the proposed security policy 280 of the customer 110 during step 945 and the third-party portal 200 sends an ACCEPT response back to the customer 110 during step 950. If using a new agreement, the new agreement is saved as an agreement 295 under the sharing data 350 in the account of the third party 130.

then those directives are enforced. How a directive is enforced depends on the directive itself.

In one or more embodiments, triggers come in two forms: event-based triggers, or time-based triggers. Event-based triggers are triggered based on user activity. Time-based triggers are triggered by scheduled (cron) jobs that fire at set intervals. These scheduled jobs are run in some embodiments within the third-party portal 200.

Below is an example showing representative directives, triggers, and the enforcement engine 230 relate to each other.

| Trigger | Trigger Type | Directives Mapped to Trigger | Enforcement engine 230 Action |
| --- | --- | --- | --- |
| Customer accesses questionnaire response | Event-based | dataAccessExpiration = 90 days from point when Questionnaire was submitted | Deny access if data access window of 90 days has passed |
| Customer requests access to sensitive questionnaire responses for new user at customer organization | Event-based | dataAccessMax Viewers = 5; dataAccessRole = Owner | Deny access if this user would be the 6$^{th}$ unique user with access to this question's response; Deny access if the new user's role is not Owner |
| Every day | Time-based | dataAccessExpiration = 90 days from point when Questionnaire was submitted; dataRetentionInterval = 120 days from point when Questionnaire was submitted | Revoke access to responses to all Users in Customer organization if data access has expired; Purge Questionnaire data from Portal if retention interval has passed. |
| Questionnaire Updated | Event-based | scrubPII = true; dataLocation = EU | Check for sensitive personal data (PII) content in responses and scrub them; Save question responses in the EU data center | ii. MODIFY (determined during step 955) the security policy 280 manually during step 965. If no fourth party 140 delegation is required during step 970, the third party 130 then signs a new agreement during step 994 and the new agreement is sent to the customer 110 during step 998.
  iii. If fourth party 140 delegation is required during step 970, agreements are established between the third party 130 and the fourth party 140 during step 975, in the manner described above for agreements between the customer 110 and the third party 130. If the agreements between the third party 130 and the fourth party 140 are reached during step 980, the flow proceeds to step 990 and continues in the manner described above. If, however, the agreements between the third party 130 and the fourth party 140 are not reached during step 980, then a reject response is sent to the customer 110 during step 985.
  iv. REJECT (determined during step 955) the security policy 280 and send a REJECT response back to the customer 110 during step 960 through the third-party portal 200.

Policy Enforcement

After the customer 110 and third party 130 reach an agreement, the third-party portal 200 enforces the directives within the security policy 280 of the agreement for each of the questions. Enforcement is carried out by the enforcement engine 230 of the third-party portal 200. The enforcement engine 230 reacts to triggers that are associated with the directives. When a trigger fires, the enforcement engine 230 maps the trigger to directives that need to be enforced, and Update Flows After an agreement has been established and a security policy 280 is in effect, the customer 110, third party 130 and/or additional parties (e.g., a fourth party 140) may need to modify the agreement. Consider the following important scenarios:
  1) customer-initiated modification:
    a. customer wants to add questions;
    b. customer wants to delete questions;
    c. customer wants to modify questions; and/or
    d. customer wants to modify the security policy for one or more questions.
  2) third-party initiated modification:
    a. third party wants to add a fourth party;
      i. adding a fourth party does not require a change to the security policy 280;
      ii. adding a fourth party does require a change to the security policy 280;
    b. third party wants to modify the security policy on his/her own customer-initiated modification.

Figure 10:
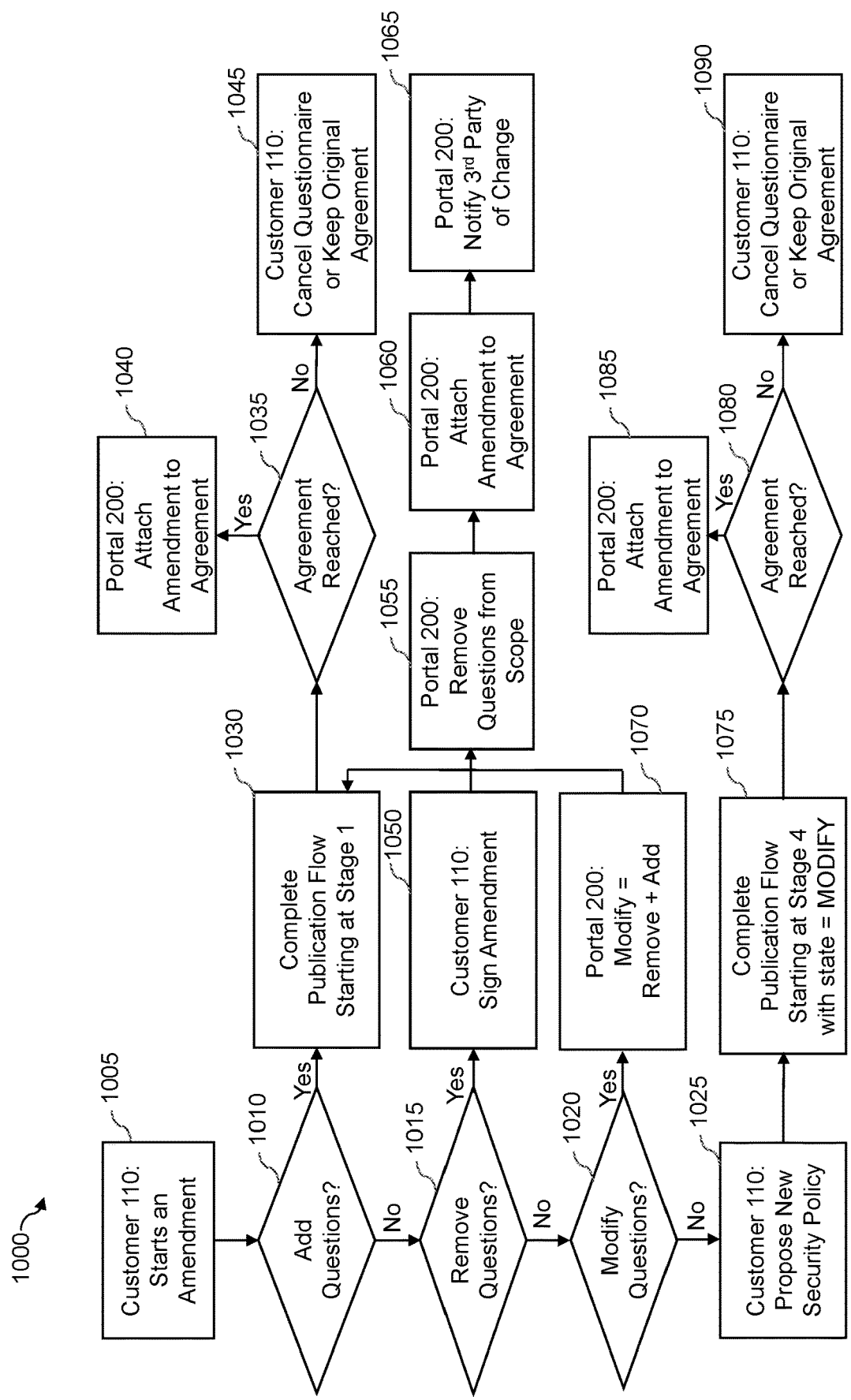
FIG. 10 is a flow chart illustrating an exemplary implementation of a customer-initiated modification process, according to one embodiment of the disclosure.

FIG. 10 is a flow chart illustrating an exemplary implementation of a customer-initiated modification process 1000, according to one embodiment of the disclosure. Generally, the exemplary customer-initiated modification process 1000 processes customer-initiated amendments to change an existing agreement during step 1005.

1) If the customer 110 wants to add new questions to the questionnaire during step 1010, those new questions can be handled as a mini questionnaire containing only those questions. The customer 110 proceeds through the publication flow (FIG. 5) during step 1030 starting at Stage 1 with just the new questions and tries to reach an agreement on the amendment with the third party 130.

a. If an agreement for the amendment can be reached during step 1035, the third-party portal 200 attaches the amendment to the original agreement during step 1040. The amendment should be signed by the customer 110 and third party 130 and include any linked agreements with fourth parties 140.

b. If an agreement for the amendment cannot be reached during step 1035, the customer 110 has the option during step 1045, to either cancel the questionnaire entirely or continue with the original agreement.

2) If the customer 110 wants to remove questions from the questionnaire during step 1015, the customer 110 simply signs an amendment declaring those questions to be removed during step 1050. The amendment needs to only be signed by the customer 110. The third-party portal 200 removes the questions during step 1055, attaches an amendment to the agreement during step 1060 and notifies the third party 130 during step 1065 of the reduction in scope of the questionnaire.

3) If the customer wants to modify questions in the questionnaire during step 1020, this is handled as a simultaneous removal of the questions to be modified, and an addition of the new questions that will take the place of the removed questions during step 1070. Thus, the flow splits into two paths and simultaneously goes through steps 1030 and 1055 above.

4) Finally, the customer 110 can choose to modify the security policy 280 during step 1020 that was agreed upon for one or more questions, without changing the set of questions in the questionnaire. To do this, the customer 110 proposes a new security policy 280 during step 1025 for the subset of questions in question, and the third-party portal 200 runs the Publication Flow during step 1075 starting at Stage 4 (FIG. 9), with the state set to MODIFY.

a. If an agreement for the amendment can be reached during step 1080, the third-party portal 200 attaches the amendment to the original agreement during step 1085. The agreement should be signed by the customer 110 and third party 130 and including any linked agreements with fourth parties 140.

b. If an agreement for the amendment cannot be reached during step 1080, the customer 110 has the option to either cancel the questionnaire entirely or continue with the original agreement during step 1090.

Figure 11:
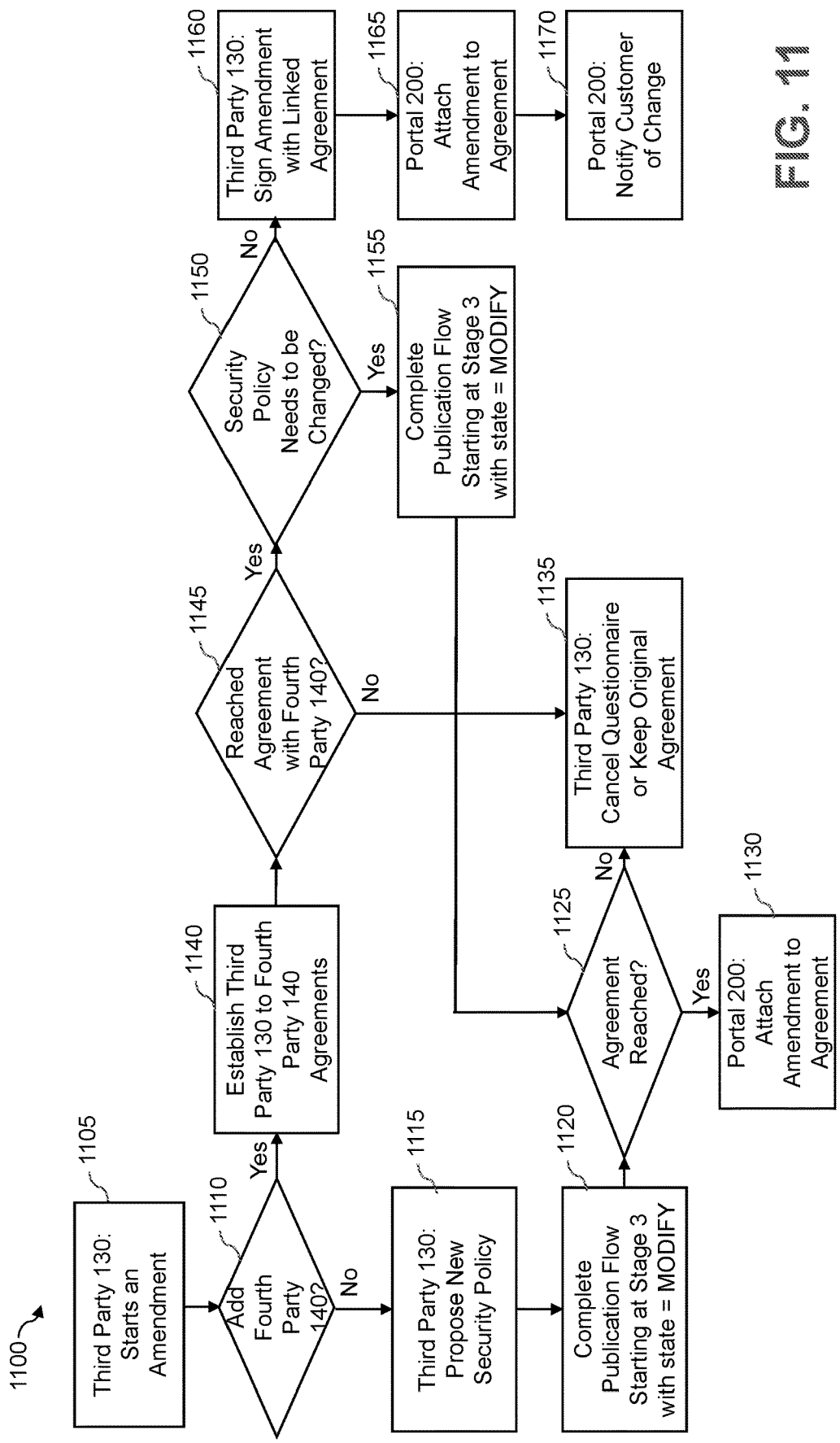
FIG. 11 is a flow chart illustrating an exemplary implementation of a third party third-party initiated modification process, according to one or more embodiments.

FIG. 11 is a flow chart illustrating an exemplary implementation of a third-party initiated modification process 1100, according to one or more embodiments. Generally, the exemplary third party-initiated modification process 1100 processes third-party initiated amendments to change an existing agreement.

1) The third party 130 starts an amendment during step 1105.

2) If the third party 130 needs to add a fourth party 140 during step 1110 (e.g., because the third party 130 realizes after the fact that delegation is needed), then the first step is to establish an agreement on a security policy 280 during step 1140 with the fourth party 140, following the same process outlined in the Publication Flow (FIG. 7). If the third party 130 does not add a fourth party 140 during step 1110, the third party 130 proposes a new security policy 280 during step 1115 and the flow during step 1120 mimics the Publication Flow at Stage 3 (FIG. 8), with the state=MODIFY.

a. If an agreement cannot be reached during step 1145, the third party 130 has the option during step 1135 of cancelling the questionnaire altogether or keeping the original agreement.

b. If an agreement can be reached during step 1145, there are two scenarios:

i. The agreement with the fourth party 140 requires a change to the security policy 280 during step 1150. In this case, the flow during step 1155 mimics the Publication Flow starting at Stage 3 (FIG. 8), with the state=MODIFY:

1. If an agreement with the customer 110 can be reached for the new security policy 280 during step 1125, then the amendment is attached to the original agreement during step 1130.

2. If an agreement cannot be reached with the customer 110 during step 1125, the third party 130 has the option during step 1135 of cancelling the questionnaire or keeping the original agreement.

ii. The agreement with the fourth party 140 does not require a change to the security policy 280 during step 1150. In this case, the third party 130 can simply sign the amendment during step 1160 with the linked fourth party agreement during step 1165, and the third-party portal 200 simply notifies the customer 110 of the change during step 1170.

3) If the third party wants to change the security policy on his/her own during step 1150, the third party 130 proposes a new security policy 280 during step 1155 and the flow mimics Publication Flow: Stage 3 (FIG. 8), with the state=MODIFY.

a. If an agreement with the customer 110 can be reached for the new security policy 280 during step 1125, then the amendment is attached to the original agreement during step 1130.

b. If an agreement cannot be reached with the customer 110 during step 1125, the third party 130 has the option during step 1135 of cancelling the questionnaire or keeping the original agreement.

Auditing

In one or more embodiments, significant actions relevant to the security policy 280 are audited by the third-party portal 200. These actions include, for example, establishment of agreements, amendments to agreements, and enforcement of directive actions.

Third-Party Portal Flow

Figure 12:
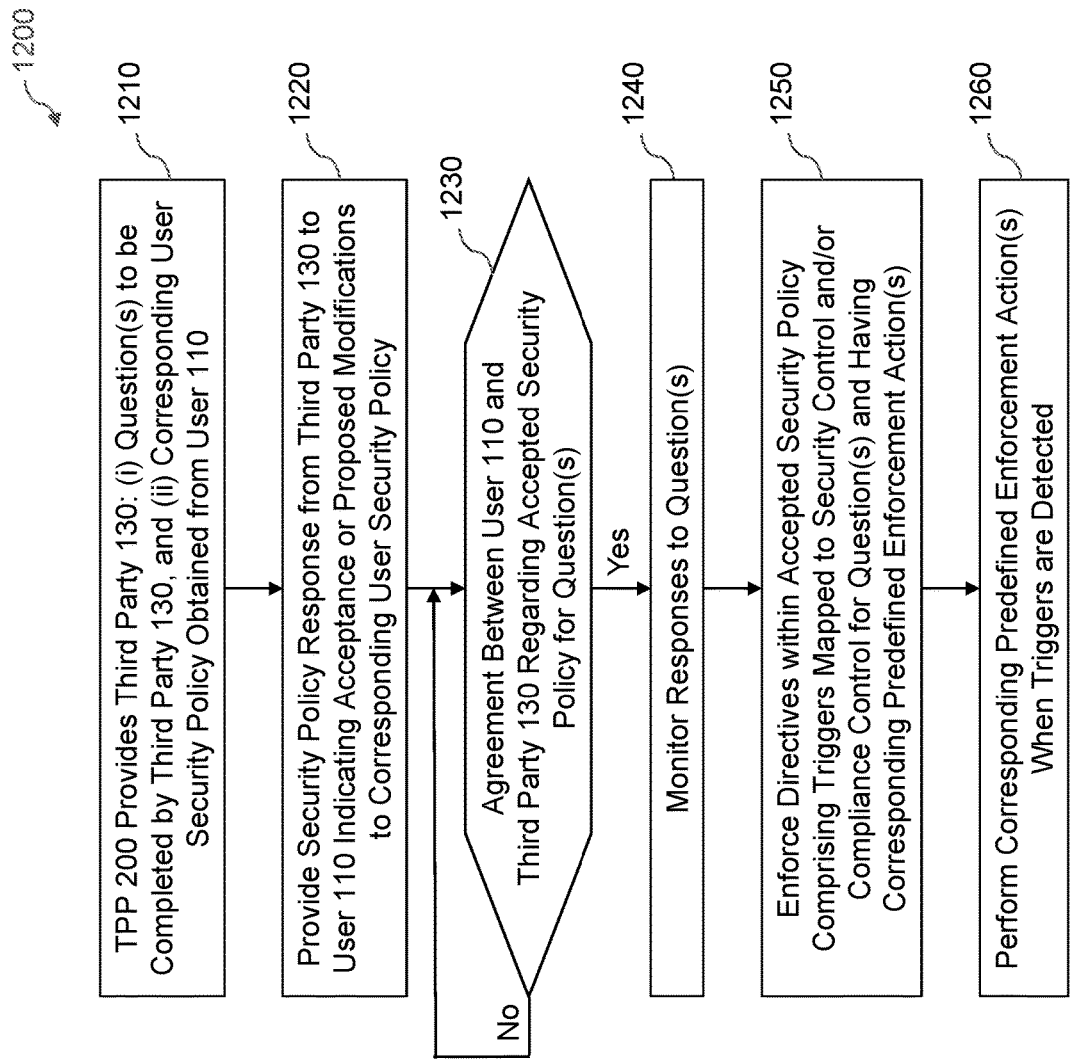
FIG. 12 is a flow chart illustrating an exemplary implementation of a security policy exchange and enforcement process, according to some embodiments.

FIG. 12 is a flow chart illustrating an exemplary implementation of a security policy exchange and enforcement process 1200, according to some embodiments. As shown in FIG. 12, during step 1210, the third-party portal 200 provides the third party 130 with: (i) one or more questions to be processed by third party 130, and (ii) corresponding user security policy obtained from user 110. The provided questions are to be processed by the third party 130 in accordance with the corresponding user security policy.

A security policy response from the third party 130 is provided to the user 110 during step 1220 indicating an acceptance or proposed modifications to the corresponding user security policy. During step 1230, a test is performed to determine if there is an agreement between the user 110 and the third party 130 regarding an accepted security policy for the questions.

Once it is determined during step 1230 that there is an agreement between the user 110 and the third party 130 regarding an accepted security policy for questions, the security policy exchange and enforcement process 1200 monitors for any responses to the questions during step 1240. In addition, any directives within the accepted security policy for the questions are enforced during step 1250. As noted above, the directives comprise triggers mapped to security control and/or compliance control for the questions and the triggers have at least one corresponding predefined enforcement action.

Finally, the corresponding predefined enforcement actions are performed during step 1260 when any triggers are detected.

One or more embodiments of the disclosure provide a third-party portal 200 for security policy exchange and enforcement for question delegation systems.

In some embodiments, a policy framework and workflow are provided as part of the third-party portal 200 for companies and third parties to describe their security requirements for questionnaires in such a way that an intermediate platform shared by the companies and third parties can interpret and enforce those requirements. The disclosed intermediate platform allows companies to publish questionnaires to be processed by the third parties and allows third parties to answer questionnaires and submit responses back to companies. Among other benefits, the disclosed policy framework makes security requirements between companies and third parties explicit, and these requirements can be technically enforced, simultaneously protecting third parties and companies from the mishandling of third-party data.

In some embodiments, the disclosed techniques for security policy exchange and enforcement for question delegation provide a systematic way for delegating questions to third parties, and for ensuring the enforcement of security policies associated with the delegated questions.

One or more embodiments of the disclosure provide improved methods, apparatus and computer program products for security policy exchange and enforcement for question delegation. The foregoing applications and associated embodiments should be considered as illustrative only, and numerous other embodiments can be configured using the techniques disclosed herein, in a wide variety of different applications.

It should also be understood that the disclosed question delegation and security enforcement techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for security policy exchange and enforcement for question delegation may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based third-party portal 200, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based third-party portal platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 13 and 14. These platforms may also be used to implement at least portions of other information processing systems in other embodiments.

Figure 13:
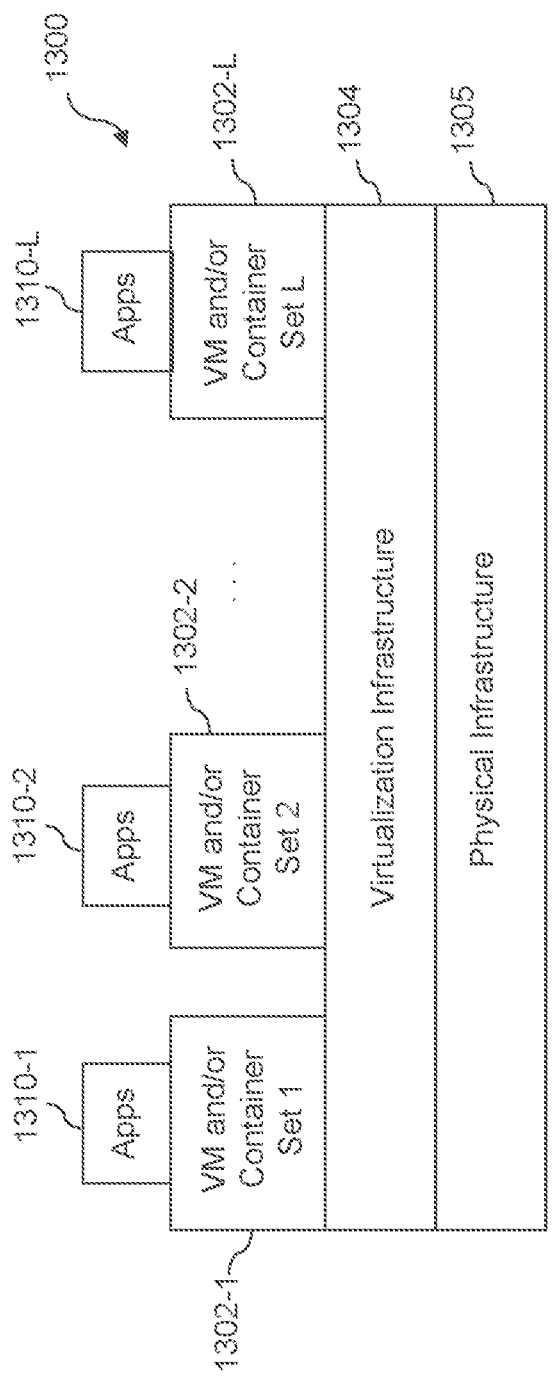
FIG. 13 illustrates an exemplary processing platform that may be used to implement at least a portion of one or more embodiments of the disclosure comprising a cloud infrastructure.

FIG. 13 shows an example processing platform comprising cloud infrastructure 1300. The cloud infrastructure 1300 comprises a combination of physical and virtual processing resources that may be utilized to implement at least a portion of the third-party portal 200. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 may comprise respective VMs, respective sets of one or more containers, or respective sets of one or more containers running in VMs.

In some implementations of the FIG. 13 embodiment, the VMs/container sets 1302 comprise respective VMs implemented using virtualization infrastructure 1304 that comprises at least one hypervisor. Such implementations can provide question delegation and security enforcement functionality of the type described above for one or more processes running on a given one of the VMs. For example, each of the VMs can implement question delegation and security enforcement control logic and associated agreements for providing question delegation and security enforcement functionality for one or more processes running on that particular VM.

An example of a hypervisor platform that may be used to implement a hypervisor within the virtualization infrastructure 1304 is the VMware® vSphere® which may have an associated virtual infrastructure management system such as the VMware® vCenter™. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system. Such implementations can provide question delegation and security enforcement functionality of the type described above for one or more processes running on different ones of the containers. For example, a container host device supporting multiple containers of one or more container sets can implement one or more instances of question delegation and security enforcement control logic and associated agreements for use in question delegation.

As is apparent from the above, one or more of the processing modules or other components of the third-party portal 200 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises at least a portion of the given system and includes a plurality of processing devices, denoted 1402-1, 1402-2, 1402-3, . . . 1402-K, which communicate with one another over a network 1404. The network 1404 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1402-1 in the processing platform 1400 comprises a processor 1410 coupled to a memory 1412. The processor 1410 may comprise a microprocessor, a microcontroller, an application specific integrated circuit (ASIC), a field programmable gate array (FPGA) or other type of processing circuitry, as well as portions or combinations of such circuitry elements, and the memory 1412, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and the given system may include additional or alternative processing platforms, as well as numerous distinct processing platforms in any combination, with each such platform comprising one or more computers, storage devices or other processing devices.

Figure 14:
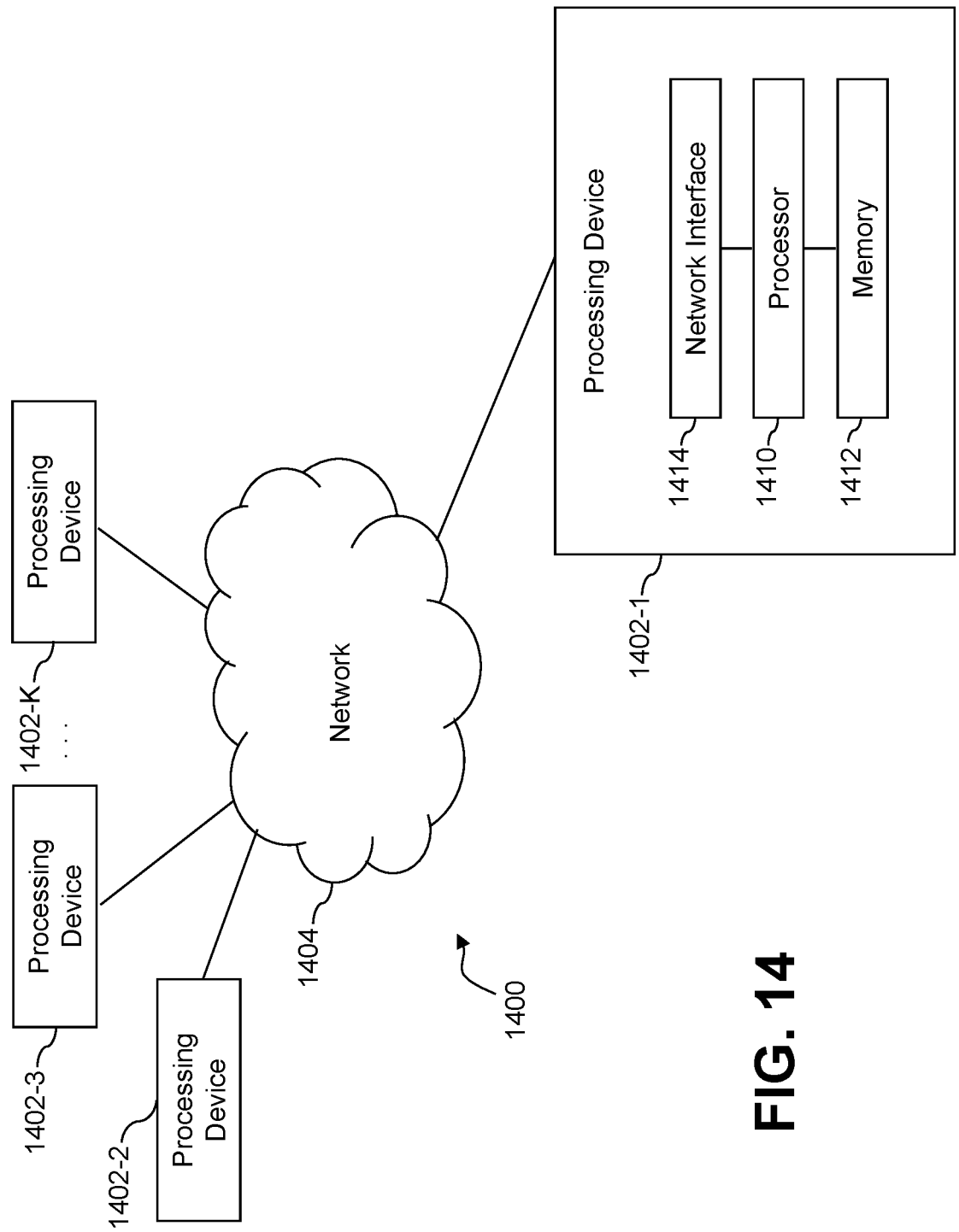
FIG. 14 illustrates another exemplary processing platform that may be used to implement at least a portion of one or more embodiments of the disclosure.

Multiple elements of an information processing system may be collectively implemented on a common processing platform of the type shown in FIG. 13 or 14, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
providing, by a third-party portal processing system, at least one third party with at least one question obtained from a user and a corresponding machine-readable user security policy, wherein the at least one question is to be processed by the at least one third party in accordance with the corresponding machine-readable user security policy, wherein the corresponding machine-readable security policy comprises one or more access controls for data associated with one or more of the at least one question and one or more responses to the at least one question;
providing a security policy response from the at least one third party to the user indicating one or more of an acceptance of the corresponding machine-readable user security policy and one or more proposed modifications to the corresponding user machine-readable security policy for the at least one question;
performing the following steps once there is an agreement between the user and the at least one third party regarding an accepted machine-readable security policy for the at least one question:
extracting one or more directives, related to the one or more access controls for the data, from the accepted machine-readable security policy for the at least one question;
monitoring one or more responses to the at least one question;
enforcing, by the third-party portal processing system, the one or more extracted directives, wherein the one or more extracted directives comprise one or more triggers mapped to the one or more access controls for the data, wherein the one or more access controls for the data comprise one or more of a security control and a compliance control for the at least one question, and wherein the one or more triggers each have at least one corresponding predefined enforcement action that enforces the one or more access controls for the data; and
automatically performing the at least one corresponding predefined enforcement action in response to detecting a given trigger.

2. The method of claim 1, wherein the at least one third party delegates one or more responses to another party.

3. The method of claim 1, wherein at least a portion of the corresponding user security policy is automatically generated based on one or more usage rules of the user.

4. The method of claim 1, wherein one or more of the directives are automatically generated based on one or more sharing rules of the user.

5. The method of claim 1, further comprising comparing one or more directives within a security policy of one or more of the user and the at least one third party with one or more directives in a proposed agreement between the user and the at least one third party and generating one or more conflicts based on the comparison.

6. The method of claim 1, further comprising attaching a digital signature of one or more of the user and the at least one third party and to the accepted security policy for the at least one question and wrapping a digital signature of an additional party with the digital signature of one or more of the user and the at least one third party.

7. The method of claim 1, wherein one or more of usage rules of the user and sharing usage rules of the user are automatically obtained from one or more of a non-disclosure agreement and a non-disclosure agreement template.

8. The method of claim 1, further comprising matching the at least one question against existing questions known to the third-party portal processing system in a question library using the text of the at least one question.

9. The method of claim 1, further comprising identifying one or more unexpired agreements of the user related to data usage with respect to the at least one question.

10. The method of claim 1, wherein the one or more triggers comprise one or more of event-based triggers based on user activity and time-based triggers based on scheduled jobs executed by the third-party portal processing system.

11. The method of claim 1, further comprising processing at least one modification of the accepted security policy for the at least one question.

12. The method of claim 1, further comprising generating an audit of the accepted security policy for the at least one question.

13. A system, comprising:
a memory; and
at least one processing device, coupled to the memory, operative to implement the following steps:
providing, by a third-party portal processing system, at least one third party with at least one question obtained from a user and a corresponding machine-readable user security policy, wherein the at least one question is to be processed by the at least one third party in accordance with the corresponding machine-readable user security policy, wherein the corresponding machine-readable security policy comprises one or more access controls for data associated with one or more of the at least one question and one or more responses to the at least one question;
providing a security policy response from the at least one third party to the user indicating one or more of an acceptance of the corresponding machine-readable user security policy and one or more proposed modifications to the corresponding user machine-readable security policy for the at least one question;
performing the following steps once there is an agreement between the user and the at least one third party regarding an accepted machine-readable security policy for the at least one question:
extracting one or more directives, related to the one or more access controls for the data, from the accepted machine-readable security policy for the at least one question;
monitoring one or more responses to the at least one question;
enforcing, by the third-party portal processing system, the one or more extracted directives, wherein the one or more extracted directives comprise one or more triggers mapped to the one or more access controls for the data, wherein the one or more access controls for the data comprise one or more of a security control and a compliance control for the at least one question, and wherein the one or more triggers each have at least one corresponding predefined enforcement action that enforces the one or more access controls for the data; and automatically performing the at least one corresponding predefined enforcement action in response to detecting a given trigger.

14. The system of claim 13, further comprising comparing one or more directives within a security policy of one or more of the user and the at least one third party with one or more directives in a proposed agreement between the user and the at least one third party and generating one or more conflicts based on the comparison.

15. The system of claim 13, wherein one or more of usage rules of the user and sharing usage rules of the user are automatically obtained from one or more of a non-disclosure agreement and a non-disclosure agreement template.

16. The system of claim 13, further comprising generating an audit of the accepted security policy for the at least one question.

17. A computer program product, comprising a non-transitory machine-readable storage medium having encoded therein executable code of one or more software programs, wherein the one or more software programs when executed by at least one processing device perform the following steps:

providing, by a third-party portal processing system, at least one third party with at least one question obtained from a user and a corresponding machine-readable user security policy, wherein the at least one question is to be processed by the at least one third party in accordance with the corresponding machine-readable user security policy, wherein the corresponding machine-readable security policy comprises one or more access controls for data associated with one or more of the at least one question and one or more responses to the at least one question;

providing a security policy response from the at least one third party to the user indicating one or more of an acceptance of the corresponding machine-readable user security policy and one or more proposed modifications to the corresponding user machine-readable security policy for the at least one question;

performing the following steps once there is an agreement between the user and the at least one third party regarding an accepted machine-readable security policy for the at least one question:

extracting one or more directives, related to the one or more access controls for the data, from the accepted machine-readable security policy for the at least one question;

monitoring one or more responses to the at least one question;

enforcing, by the third-party portal processing system, the one or more extracted directives, wherein the one or more extracted directives comprise one or more triggers mapped to the one or more access controls for the data, wherein the one or more access controls for the data comprise one or more of a security control and a compliance control for the at least one question, and wherein the one or more triggers each have at least one corresponding predefined enforcement action that enforces the one or more access controls for the data; and automatically performing the at least one corresponding predefined enforcement action in response to detecting a given trigger.

18. The computer program product of claim 17, further comprising comparing one or more directives within a security policy of one or more of the user and the at least one third party with one or more directives in a proposed agreement between the user and the at least one third party and generating one or more conflicts based on the comparison.

19. The computer program product of claim 17, wherein one or more of usage rules of the user and sharing usage rules of the user are automatically obtained from one or more of a non-disclosure agreement and a non-disclosure agreement template.

20. The computer program product of claim 17, further comprising generating an audit of the accepted security policy for the at least one question.

\* \* \* \* \*

UNITED STATES PATENT AND TRADEMARK OFFICE
CERTIFICATE OF CORRECTION

PATENT NO. : 11,343,255 B2
APPLICATION NO. : 16/456302
DATED : May 24, 2022
INVENTOR(S) : Naveen Sunkavally et al.

It is certified that error appears in the above-identified patent and that said Letters Patent is hereby corrected as shown below:

In the Claims

Column 22, Lines 2-3, in Claim 6, replace "and the at least one third party and to the," with -- and the at least one third party to the --

Signed and Sealed this
Fifth Day of July, 2022

Katherine Kelly Vidal
*Director of the United States Patent and Trademark Office*